United States Patent
Rabii et al.

(10) Patent No.: US 9,665,217 B2
(45) Date of Patent: May 30, 2017

(54) TOUCH PANEL SCAN CONTROL

(71) Applicant: QUALCOMM Incorporated, San Diego, CA (US)

(72) Inventors: Khosro Mohammad Rabii, San Diego, CA (US); Suhail Jalil, Poway, CA (US); Mohamed Imtiaz Ahmed, San Marcos, CA (US); Dat Tien Pham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 14/263,786

(22) Filed: Apr. 28, 2014

(65) Prior Publication Data

US 2015/0309610 A1    Oct. 29, 2015

(51) Int. Cl.
*G06F 3/044* (2006.01)
*G06F 3/041* (2006.01)

(52) U.S. Cl.
CPC .......... *G06F 3/044* (2013.01); *G06F 3/0412* (2013.01); *G06F 3/0416* (2013.01); *G06F 3/0418* (2013.01)

(58) Field of Classification Search
USPC .............................................. 345/173–174
See application file for complete search history.

(56) References Cited

U.S. PATENT DOCUMENTS

| | | | |
|---|---|---|---|
| 8,294,687 B1 * | 10/2012 | Ksondzyk | 345/173 |
| 8,542,208 B2 | 9/2013 | Krah et al. | |
| 9,182,865 B2 * | 11/2015 | Chae | G06F 3/0416 |
| 2010/0013791 A1 | 1/2010 | Haga et al. | |
| 2010/0245286 A1 * | 9/2010 | Parker | 345/174 |
| 2010/0327889 A1 * | 12/2010 | Matsubara | 324/705 |
| 2011/0157068 A1 | 6/2011 | Parker et al. | |
| 2012/0050211 A1 | 3/2012 | King et al. | |
| 2012/0050216 A1 * | 3/2012 | Kremin et al. | 345/174 |
| 2012/0154324 A1 | 6/2012 | Wright et al. | |
| 2012/0249442 A1 | 10/2012 | Chang et al. | |
| 2012/0256868 A1 | 10/2012 | Choi et al. | |
| 2013/0176273 A1 | 7/2013 | Li et al. | |

(Continued)

OTHER PUBLICATIONS

International Search Report and Written Opinion—PCT/US2015/026124—ISA/EPO—Jul. 3, 2015.

*Primary Examiner* — William Boddie
*Assistant Examiner* — Bryan Earles
(74) *Attorney, Agent, or Firm* — Knobbe, Martens, Olson & Bear, LLP

(57) ABSTRACT

Certain aspects relate to systems and techniques for scan control for scanning a touch panel. The scan control system can alternate adaptively between scanning the touch panel in a passive scan mode requiring minimal power and in a focused active scan mode that sequentially scans only a portion of the touch panel. The scan control system can monitor the absolute capacitance of some or all of the sensors of the touch panel in passive scan mode and can monitor the mutual capacitance of a portion of the touch panel in focused active scan mode. If the absolute capacitance of any sensor is greater than the baseline capacitance, then the scan control can use this absolute capacitance touch data to determine one or more sub-regions of the touch panel for scanning in focused active scan mode. The mutual capacitance touch data can be used for determining features of the touch event.

30 Claims, 7 Drawing Sheets

(56) References Cited

U.S. PATENT DOCUMENTS

| | | | |
|---|---|---|---|
| 2013/0265276 A1* | 10/2013 | Obeidat | G06F 3/044 |
| | | | 345/174 |
| 2013/0285971 A1* | 10/2013 | Elias | G06F 3/044 |
| | | | 345/174 |
| 2013/0307821 A1 | 11/2013 | Kogo | |
| 2014/0049501 A1* | 2/2014 | Santos et al. | 345/174 |
| 2014/0104218 A1* | 4/2014 | Drader et al. | 345/173 |
| 2015/0160779 A1* | 6/2015 | Huang et al. | 345/174 |

\* cited by examiner

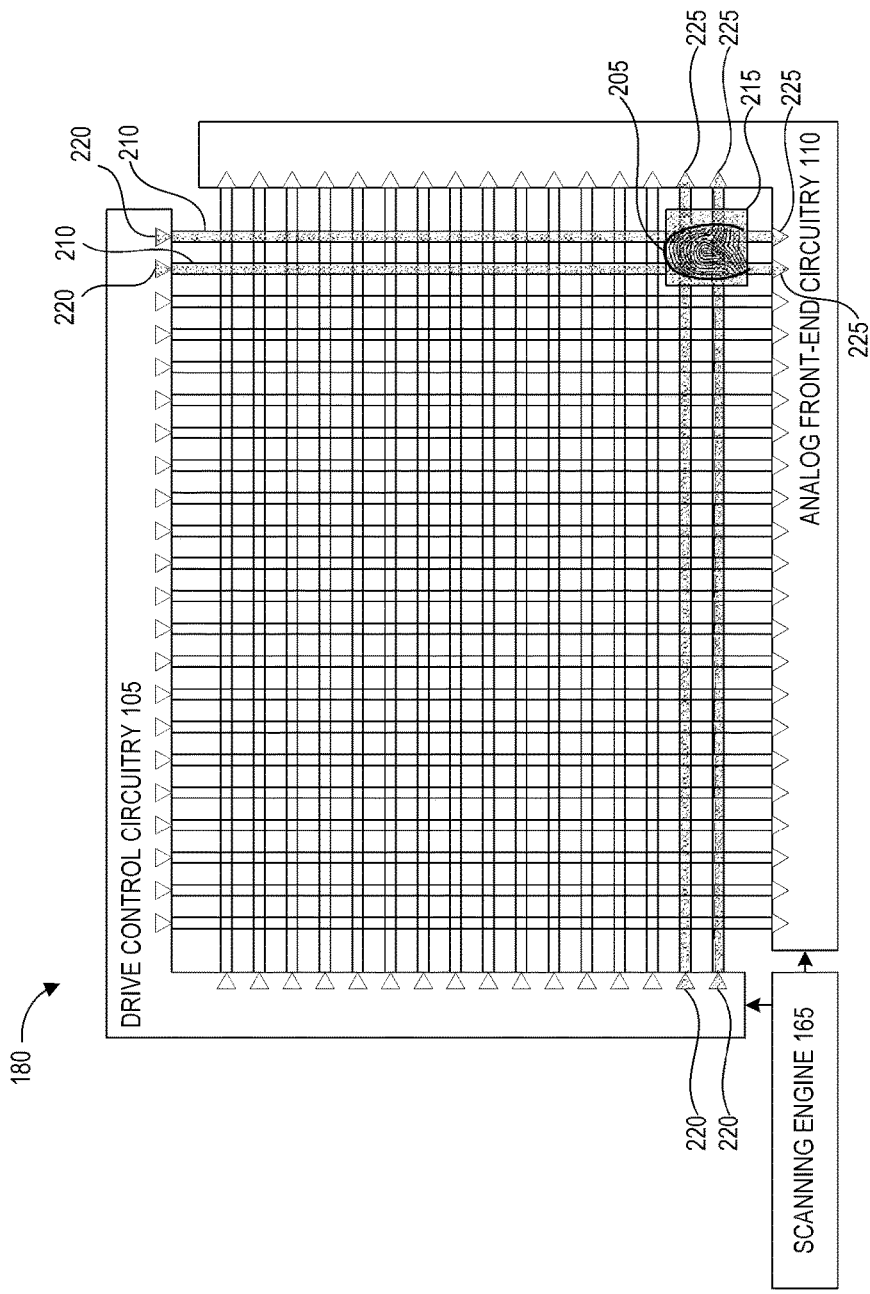

TOUCH PANEL SCAN CONTROL PROCESS

TOUCH PANEL SCAN CONTROL

TECHNICAL FIELD

The systems and methods disclosed herein are directed to touch sensing, and, more particularly, to increased efficiency in touch sensing.

BACKGROUND

Advances in technology have resulted in smaller and more powerful computing devices. For example, there currently exist a variety of portable computing devices, including wireless computing devices such as wireless telephones, personal digital assistants (PDAs), portable gaming consoles, and tablet computers that are small, lightweight, and easily carried by users. In order to simplify user interfaces and to avoid pushbuttons and complex menu systems, such portable computing devices typically implement touch screen displays that detect user gestures on the touch screen and translate the detected gestures into commands to be performed by the device. Such gestures may be performed using one or more fingers or a stylus type pointing implement. Multi-touch screens (touch screens having multi-touch capability) are designed to recognize and track several simultaneous touches. For example, when a user moves two fingers on a screen, information indicating touch/movement for both fingers is provided by a multi-touch screen.

There are several touch screen technologies currently available which support multi-touch input, including capacitive, resistive, and optical touch sensing using cameras. Capacitive technology operates by sensing the electric current from a user's finger, which interrupts the electrostatic field of the touch screen, resulting in a detected touch. In some implementations, a touchscreen can include a projected capacitive touch (PCT) sensor arranged over a display. The PCT sensor can include an array of capacitors formed by a number of sensor sensors in the form of overlapping sensors, such as row sensors and column sensors that are arranged in a grid pattern. The high resolution of PCT allows operation with no direct contact, supporting hover touch detection, allowing the panel to be coated with protective insulating layers, and allowing the panel to operate even under screen protectors or behind weather-proof or shatter-resistant panels. Depending on the implementation, an active or passive stylus can be used instead of or in addition to a finger. As such, PCT is a more robust solution versus resistive touch technology. Accordingly, touch sensitive mobile devices commonly implement PCT technology.

Several drawbacks of implementing PCT technology on portable computing relate to the costs typically required for recognizing and locating touch events within the sensor array, leading to undesirable latency and power drainage, particularly because mobile devices generally have more limited processing resources and operate on battery-supplied power. Despite these limitations, many common mobile applications such as maps, games, email clients, web browsers, etc., are making increasingly complex use of touch recognition. Further, panel scan time and touch processing complexity increase proportional to touch-node capacity, which in turn increases proportional to display size. Therefore, because there is a trend in many portable computing devices toward increasing display size and touch complexity, touch processing is increasingly reducing device performance and threatening battery life. Further, user interaction with a device through touch events is highly sensitive to latency, and user experience can suffer from long scan times for large touchscreen panels, resulting in processing delay and response lag.

SUMMARY

The foregoing problems, among others, can be addressed in some embodiments by providing a touch panel scan control system that alternates adaptively between a passive scan mode requiring minimal power and a focused active scan mode that sequentially scans only a portion of the touch panel. When operating in the passive scan mode, a scanning engine of the touch system can monitor the absolute capacitance of some or all of the sensors of the touch panel. If the absolute capacitance of any sensor is greater than the baseline capacitance, then the scanning engine can use this absolute capacitance touch data representing the touch event to determine one or more sub-regions of the touch panel approximating the location of the touch event. The scanning engine can scan the sub-region or sub-regions in focused active scan mode by sequentially applying voltage to sensors located within the sub-region or sub-regions, generating mutual capacitance touch data representing the touch event. The mutual capacitance touch data can be used for determining features of the touch event such as size, shape, location, movement, and the like.

Accordingly, one aspect relates to a touch sensing display system comprising a touch panel including a plurality of sensors arranged to form a plurality of capacitors, drive circuitry in data communication with a plurality of output terminals, each of the plurality of output terminals configured to apply voltage to one of the plurality of sensors when activated, and analog front-end circuitry in data communication with a plurality of input terminals, each of the plurality of input terminals configured to sense electrical signals from one of the plurality of sensors; a scan control system including a passive scan module and a focused active scan module, the scan control system configured to at least generate instructions for a scan of the touch panel by adaptively selecting one of the passive scan module and the focused active scan module to perform the scan of the touch panel; and a scanning engine configured to at least configure one or both of the drive circuitry and the analog front-end circuitry to perform the scan according to the instructions.

Another aspect relates to a method for detecting touch events on a touch panel, the method comprising selecting a passive scan mode for a first scan of at least a portion of the touch panel; based on the selection of the passive scan mode, measuring absolute capacitance of at least one of a plurality of sensors of the touch panel to determine a measured absolute capacitance value; comparing the measured absolute capacitance to a baseline absolute capacitance value to generate a difference value; comparing the difference value to a threshold, wherein the difference value exceeding the threshold indicates a possibility of a touch event on the touch panel; in response to the difference value exceeding the threshold; selecting a focused active scan mode to perform a second scan of at least a portion of the touch panel; and in response to the difference value not exceeding the threshold; selecting the passive scan mode to perform a second scan.

Another aspect relates to non-transitory computer-readable media storing computer-executable instructions that, when executed by one or more physical computing devices, cause operations comprising measuring absolute capacitance of at least one of a plurality of sensors of the touch panel to determine a measured absolute capacitance value; comparing the measured absolute capacitance to a baseline absolute capacitance value to generate a difference value; comparing the difference value to a threshold, wherein the difference value exceeding the threshold indicates a possibility of a touch event on the touch panel; in response to the difference value exceeding the threshold; selecting a focused active scan mode to perform a scan of at least a portion of the touch panel; and in response to the difference value not exceeding the threshold; selecting a passive scan mode to perform the scan.

Another aspect relates to a touch panel display apparatus comprising means for measuring absolute capacitance of at least one of a plurality of sensors of a touch panel to determine a measured absolute capacitance value; means for comparing the measured absolute capacitance to a baseline absolute capacitance value to generate a difference value; means for comparing the difference value to a threshold, wherein the difference value exceeding the threshold indicates a possibility of a touch event on the touch panel; and means for selecting, based at least partly on a result of comparing the difference value to the threshold, one of a focused active scan mode and a passive scan mode to perform a scan of at least a portion of the touch panel.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIG. 2B illustrates one embodiment of identifying a sub-region of the touch panel based at least partly on the touch event sensed in FIG. 2A.

DETAILED DESCRIPTION

Introduction

Figure 1:
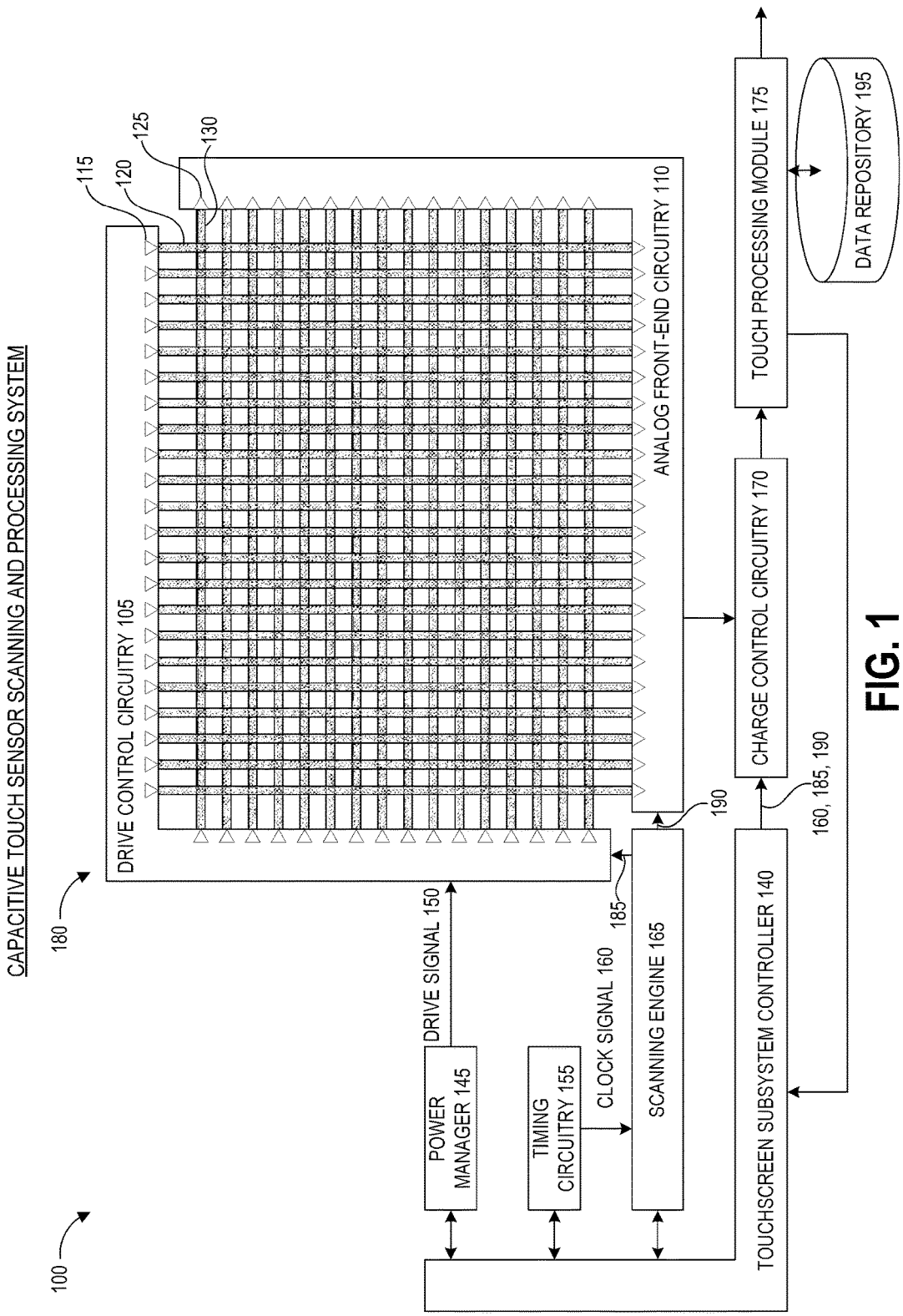
FIG. 1 illustrates an embodiment of a capacitive touch detection system including a touch panel and a scanning engine capable of performing the touch panel scan control techniques described herein.

Embodiments of the disclosure relate to systems and techniques for touch panel scan control having increased efficiency with respect to latency and power consumption. A first scan mode can passively scan some or all of the sensors of the touch panel by measuring the absolute capacitance of the sensors and comparing the measured absolute capacitance to the baseline absolute capacitance. If the measured absolute capacitance is greater than the baseline absolute capacitance for one or more sensors, this indicates that a user could be hovering over or touching the touch panel in a region at or near the sensors. Accordingly, a sub-region of the touch panel is identified based on the absolute capacitance touch data for scanning in a second scan mode. The second scan mode uses mutual capacitance scanning to sequentially scan the sensors of the sub-region, producing mutual capacitance data from which features of the touch event (e.g., size, shape, location, and movement) can be more accurately determined.

As described above, projective capacitive touch (PCT) technologies are commonly implemented on mobile devices to support touch sensing. Two distinct types of PCT sensors are known for scanning the touch panel for touch events: mutual capacitance sensors and self-capacitance sensors. Mutually capacitive sensors form a capacitor at each intersection of each row sensor and each column sensor. To scan the panel for a touch event, a voltage is sequentially applied to the rows or columns, or to pairs of intersecting sensors. Bringing a finger or conductive stylus near the surface of the sensor changes the local electric field which changes the mutual capacitance, thereby converting the touch event into electrical signals that are sensed at the second end of the sensors. The capacitance change at every individual point on the grid can be measured during sequential scanning to accurately determine the touch location by measuring the voltage at the second end of the sensor. Mutual capacitance allows multi-touch operation where multiple fingers, palms or styli can be accurately tracked at the same time. Coordinate data of the touch event can be obtained by processing data of capacitance value changing areas. However, the power costs required for continuous scans of a large touch panel by applying voltage to the sensors may require a significant percentage of the overall battery capacity of a mobile device, impairing device performance. Further, when a touch event is located far away from a current scan position, linear scanning of the touch panel sensors produces latency in the user experience.

In addition, latency for detecting touch increases proportionally to screen size, as larger screens require more touch sensors to accurately sense small touches (e.g., a finger or stylus). Linearly scanning all of the nodes of the panel should be performed at a scan rate sufficient to deliver acceptable responsiveness, that is time between touch event and detection, to provide for a user experience with no noticeable lag. Typical response times may be around 10 ms in order to update a next frame after the touch with an indication that the touch was detected. Response time is particularly important because it directly translates to how fast users can move their fingers on screen for a "swipe" or "flick" or to write with a finger or pen. A touch panel with a slow response time may look choppy or may miss a movement altogether. In order to accurately detect features of a touch event, it can be desirable to sample a node at which the touch event is occurring at least twice (arrival at the node and departure at the node) during the touch event.

Consider the following examples, based on a typical pitch density of 5 mm, corresponding to a 5 mm gap between adjacent touch sensors in the touch panel. A mobile device such as a smart phone may have a 4 inch diagonal screen size that, at screen resolution of 960 by 640, corresponds to 17 row sensors, 11 column sensors, and 187 touch nodes (e.g., capacitors formed by the intersection of row and column sensors). Accordingly, to deliver touch data within the aforementioned response time at the aforementioned sample rate, the touch panel must be scanned at a rate of 37,400 nodes per second. A mobile device such as a large tablet may have a 10.1 inch diagonal screen size that, at screen resolution of 1024 by 768, corresponds to 41 row sensors, 31 column sensors, and 1271 touch nodes. Accordingly, to deliver touch data within the aforementioned response time at the aforementioned sample rate, the touch panel must be scanned at a rate of 254,200 nodes per second. Considering that even larger panels exist, such as a display having a 60 inch diagonal and 41,796 total nodes corresponding to a scan rate of 8,359,200 nodes per second, it becomes clear that sequentially scanning nodes at higher and higher rates is not a viable solution for large touch-sensitive panels. Reducing scan resolution or response time in order to implement touch technology on larger panels can reduce the required scan rate, however will also provide undesirable latency and inaccuracy in touch detection, resulting in quality degradation for the user experience.

Self-capacitance PCT sensors can have the same sensor grid as mutual capacitance sensors, but the columns and rows operate independently. With self-capacitance scanning, voltage is not applied to the sensors, but rather the object (such as a finger) increases the parasitic capacitance compared to baseline on each column or row sensor that is touched. Self-capacitance scanning consumes significantly less power than mutual capacitance sensing, but is unable to resolve touch data with the high degree of accuracy of mutual-capacitance scanning.

To overcome the limitations of mutual-capacitance scanning and self-capacitance scanning, the touch panel scan control techniques described herein exploits the advantages of each mutual-capacitance scanning and self-capacitance scanning without incurring their respective disadvantages. This is accomplished, in one embodiment, by adaptively alternating between a passive scan mode requiring minimal power and a focused active scan mode that sequentially scans only a portion of the touch panel. As described above, a scanning engine of the touch panel operating in the passive scan mode can measure the absolute capacitance of some or all sensors of the touch panel. Based on detected changes in the measured absolute capacitance, the scanning engine can identify a sub-region of the touch panel which is likely to contain a touch event. Accordingly, until a likely touch event is identified, the scanning engine operates on minimal power, conserving battery life of a mobile device including the touch panel. The scanning engine can then use mutual capacitance scanning to generate raw touch data for at least a portion of the sub-region, and features of the touch event can be identified based at least partly on the raw touch data. Because mutual capacitance scanning is limited to an adaptively determined sub-region of the touch panel, the mutual capacitance scanning requires less power than a scan of the entire touch panel. Further, due to the limited size of the mutual capacitance scan, the scanning engine and can, in some examples, detect the touch event faster than it would be detected if the scanning engine carried out a scan of the entire touch panel.

Overview of Example System

FIG. 1 illustrates an embodiment of a capacitive touch detection system 100. The touch detection system 100 includes a touch panel 180, a touchscreen subsystem controller 140, a power manager 145, timing circuitry 155, a scanning engine 165, charge control circuitry 170, and a touch processing module 175.

Touch panel 180 includes drive control circuitry 105, a number of sensors 120, and analog front-end circuitry 110. Drive control circuitry 105 includes a plurality of output terminals 115. Each of the output terminals 115 corresponds with, and is connected to, a first end of a sensor 120. The sensors 120 define a coordinate system wherein each coordinate location is a capacitor formed at a junction between two of the sensors 120. Drive control circuitry 105 can provide a predetermined voltage to each of the plurality of output terminals 115 in a predetermined sequence during sequential scanning of the panel 180 in focused active scan mode. Accordingly, the output terminals 115 can generate a local electric field at each capacitor. The output terminals 115 may comprise, for example, one or more digitally controlled oscillators. In the illustrated embodiment, the output terminals 115 may be included with a capacitive touch panel assembly (e.g., as part of a capacitive touch panel controller configured for use with a touch screen assembly, and so forth), for example coupled with touch-screen subsystem controller 140 for controlling the touch panel 180.

Drive control circuitry 105 can be in data communication with the power manager 145 and the scanning engine 165 for control over when and how the output terminals 115 apply voltage to the sensors 120. For example, the power manager 145 can send a drive signal 150 to the drive control circuitry 105. In some embodiments, each drive signal 150 can be a suitable pulse of electric energy sufficient (for example, voltage) to measure the capacitive coupling between a set of sensors 120 driven in parallel, referred to as drive sensors. Using selector signals 185 provided by the scanning engine 165, the drive signal 150 can be delivered to one drive sensor at a time, e.g., in a scanned sequence from a first to a last drive sensor. The selector signals 185 from scanning engine 165 to drive control circuitry 105 can, in some embodiments, specify a subset of the output terminals 115 at which to apply drive signals 150. For example, the subset may be identified in order to scan only a sub-region of the touch panel 180. The subset may alternatively or additionally be identified to scan a fraction of the full resolution of the touch panel 180. The input terminals 115 and corresponding sensors 120 identified by selector signals 185 can correspond to a sub-region of the touch panel 180 in which a touch event has likely occurred, as described herein.

Clock signals 160 can provide a timing for the scan, referred to herein as scan rate, and be generated by the touchscreen subsystem controller 140 and delivered to the scanning engine 165 through the timing circuitry 155. The scan rate determines responsiveness of the system 100 to user input. In some embodiments, scan rate can be set to around 10 ms or less in order to provide an indication that the touch was detected in a next frame on the user device implementing system 100, corresponding to a high level of responsiveness. The scan rate can be reduced for a lower level of responsiveness or for conservation of system resources, as discussed in more detail below.

Analog front-end circuitry 110 includes a number of input terminals 125, for example low noise amplifiers and transducers, configured to sense changes in the local electric fiend generated by an instrument (e.g., a finger or stylus) at each capacitor formed by sensors 120 during sequential scanning of the panel 180 in focused active scan mode. Each of the input terminals 125 can also be configured to sense changes in the baseline capacitance of a corresponding sensor 120 during monitoring of the absolute capacitance of the sensors in passive scan mode. Analog front-end circuitry 110 is in data communication with the scanning engine 165 and the charge control circuitry 170. Analog front-end circuitry 110 can receive selector signals from the scanning engine 165 identifying one or more input terminals 125 from which to send measured signals to charge control circuitry. Accordingly, analog-front end circuitry 110 can provide, to the charge control circuitry 170, signals representing measured absolute capacitance data or measured mutual capacitance data for the sensors 120 identified by the selector signals 190. The output terminals 125 and corresponding sensors 120 identified by selector signals 190 can correspond to a sub-region of the touch panel 180 in which a touch event has likely occurred, as described herein.

Note that as used herein, the terms touch panel, sensor, and capacitor can be used interchangeably to refer to a capacitive touch sensor that senses a change in capacitance and provides a signal in response. Also, the sensors as discussed herein may be illustrated or described in reference to being a single conductor, a plurality of conductors, unidirectional conductors, or bidirectional conductors. However, different embodiments may vary the implementation of the conductors. Although a particular number and configuration of sensors 120 is depicted in FIG. 1, this is for illustrative purposes and a touch panel capable of implementing the touch panel scan control techniques described herein can have any number of sensors in one of a number of configurations (e.g., grid shaped, diamond shaped, etc.). For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Scanning engine 165 can be in communication with the touchscreen subsystem controller 140 as well as the drive control circuitry 105 and analog front-end circuitry 110 of the touch panel 180 in order to provide the scan control functionality described herein. As discussed in more detail below, touch processing module 175 can analyze touch data received from charge control circuitry 170 to adaptively determine scanning parameters including a scan mode and/or a scan region of the touch panel 180 and can provide the scanning parameters to the touchscreen subsystem controller 140. Based on the scanning parameters provided by the touch processing module, touchscreen subsystem controller 140 can configure the scanning engine 165 to send selector signals 185 to the drive control circuitry 105 corresponding to one of absolute capacitance scanning or mutual capacitance scanning. Based on the scanning parameters provided by the touch processing module, touchscreen subsystem controller 140 can also configure the scanning engine 165 to send selector signals 185 to the drive control circuitry 105 corresponding to a sub-region of the touch panel 180 and/or to send selector signals 190 to the analog front-end circuitry 110 corresponding to the sub-region. Accordingly, scanning engine 165 can configure the drive control circuitry 105 and the analog front-end circuitry 110 for one of a passive scan mode or a focused active scan mode, and can the drive control circuitry 105 and the analog front-end circuitry 110 to scan all of touch panel 180 or a sub-region of touch panel 180 using the selected mode.

Touchscreen subsystem controller 140 is a processor specifically configured for use with the touch screen panel 180 for controlling the panel 180 and the other illustrated components of the touch sensing system 100. For example, touchscreen subsystem controller 140 can manage and coordinate operations of the power manager 145, timing circuitry 155, scanning engine 165, and charge control circuitry 170 for guiding operations of the touch panel 180. Touchscreen subsystem controller 140 may be in data communication with a host processor (not illustrated) configured to handle the general processing requirements of host device. Touchscreen subsystem controller 140 may include any number of processors, micro-controllers, or other processing systems and resident or external memory for storing data and other information accessed or generated by the touchscreen subsystem controller 140. The touchscreen subsystem controller 140 may be configured to start up when the touch processing module 175 indicates that a user has touched touch screen panel 180 and to power down after release of the touch. This feature may be useful for power conservation in battery-powered computing devices.

Touchscreen subsystem controller 140 can receive touch event features and/or scanning parameters from the touch processing module 175. Based on the touch event features and/or scanning parameters, touchscreen subsystem controller 140 can generate instructions for the power manager 145, timing circuitry 155, and scanning engine 165. These instructions can in turn be used to configure the drive control circuitry 105 and the analog front-end circuitry 110 for one of a passive scan mode or a focused active scan mode, as well as configuring the drive control circuitry 105 and the analog front-end circuitry 110 to scan all of touch panel 180 or a sub-region of touch panel 180 using the selected mode.

Touchscreen subsystem controller 140 can, in some embodiments, determine and/or maintain a baseline capacitance value for the sensors of the touch panel in a no-touch condition. Baseline capacitance as used herein can refer to an untouched or ambient value of the capacitance of a pixel, group of pixels or an entire capacitive touch panel. In one example, baseline capacitance can be predetermined for the input terminals 125 and provided to the touchscreen subsystem controller 140 for storage in a memory. However, the baseline capacitance measurement is subject to variations that can be accommodated by the touchscreen subsystem controller 140. For instance, baseline capacitance can be affected by sudden ambient capacitance changes due to random events, such as a water drop, a dirt particle or even a false touch on the surface of the capacitive touch panel. Baseline capacitance can also be affected due to slow environmental shifts in temperature, humidity or other causes of drift. A conventional touch is detected by the touchscreen subsystem controller 140 or scanning engine 165 as a change in capacitance, and therefore the baseline capacitance changes described above can interfere with accurate touch detection in passive scanning mode. Accordingly, the touchscreen subsystem controller 140 can continuously or intermittently recalibrate the baseline capacitance stored in its memory to reflect the current baseline capacitance of the touch panel 180. For example, touchscreen subsystem controller 140 can implement a baseline tracking filter to track the changes in baseline capacitance over time and varying conditions and to calibrate the stored baseline capacitance parameters accordingly.

The charge control circuit 170 can receive analog signals, referred to herein as "raw touch data" and representing the measured electrical fields at input terminals 125, from analog front-end circuitry 110 and can convert these signals into a digital representation of the signals. The digital representation of the signals can be sent to touch processing module 175 for use in determining features of the touch event. Touchscreen subsystem controller 140 can output the clock signal 160 and selector signals 185, 190 to the charge control circuitry 170. Charge control circuitry 170 may receive continuous or intermittent raw touch data from the analog front-end circuitry 110 representing signal measurements at the input terminals 125. However, processing such continuous or intermittent raw touch data may waste system resources. Accordingly, clock signal 160 and selector signals 185, 190 can indicate to charge control circuitry 170 when the incoming raw touch data from the analog front-end circuitry 110 is relevant to touch processing. To illustrate, the clock signal 160 can indicate at what time the incoming raw touch data is relevant to a measurement organized by the scanning engine 165. Selector signals 185, 190 can indicate which sensor or sensors are relevant to the measurement organized by scanning engine. Accordingly, charge control circuitry 170 may process only a portion of incoming raw touch data into digital representations based on the timing and selector data from the touchscreen subsystem controller 140.

The touch processing module 175 can analyze digital touch data received from the charge control circuitry 170 and perform de-noising, false touch rejection, touch coordinate and size calculation. For example, the touch processing module 175 can determine that a touch is a valid touch and can then determine features of the touch event such as size, shape, pressure, location on the touch panel (e.g., in coordinates based on the array of sensors 120), direction, and distance of any touch movement, as well as whether the touch was a single touch or a multi-touch event. This processed touch data including features of the touch event can be sent to the touchscreen subsystem controller 140 for generating scanning parameters including clock signal 160 and selector signals 185, 190, which can be used to configure the drive control circuitry 105 and the analog front-end circuitry 110 for one of a passive scan mode or a focused active scan mode, as well as configuring the drive control circuitry 105 and the analog front-end circuitry 110 to scan all of touch panel 180 or a sub-region of touch panel 180 using the selected mode. In some embodiments, touch processing module 175 can determine the scanning parameters and send the scanning parameters to the touchscreen subsystem controller 140.

Touch processing module 175 can also output the processed touch data for use in gesture-interpretation techniques to determine which gesture or gestures were made during the touch event, for example combining physical movement as sensed by capacitance changes in the touch panel sensor grid with information about which application was in use at the time of the touch event and what the application was doing at the time of the touch event.

The touch processing module 175 can include a plurality of sub-modules in some embodiments for performing various tasks relating to filtering the input touch data to determine features of the touch event. Some or all of the touch processing module 175 may be configured as a special-use processor associated with the touchscreen subsystem controller 140. In some embodiments, some or all of the touch processing module 175 may be included in the host device central processing unit (CPU).

Touch processing module 175 can be in data communication with data repository 195. Data repository 195 can be used to store features of touch data and a baseline capacitance value, among other things. For example, data repository 195 may store features store of a number of recent touches for comparison, by touch processing module 175, to input data for determining whether a current touch event is a static touch, as described in more detail below. In addition, data repository 195 may store a baseline capacitance value for comparison, by touch processing module 175, to input data for determining whether a touch has occurred during passive scan mode. In some embodiments, touch processing module 175 may calibrate the baseline capacitance value based on input data from the touch panel 180. For example if all of the sensors 120 are outputting measured capacitance values different from a stored baseline capacitance value by a similar amount, then touch processing module 175 may recalibrate the baseline capacitance value accordingly in some embodiments. Data repository 195 can also be used to store touch history data and panel partitioning data as described below.

Overview of Example Touch Event Detection

Figure 2A:
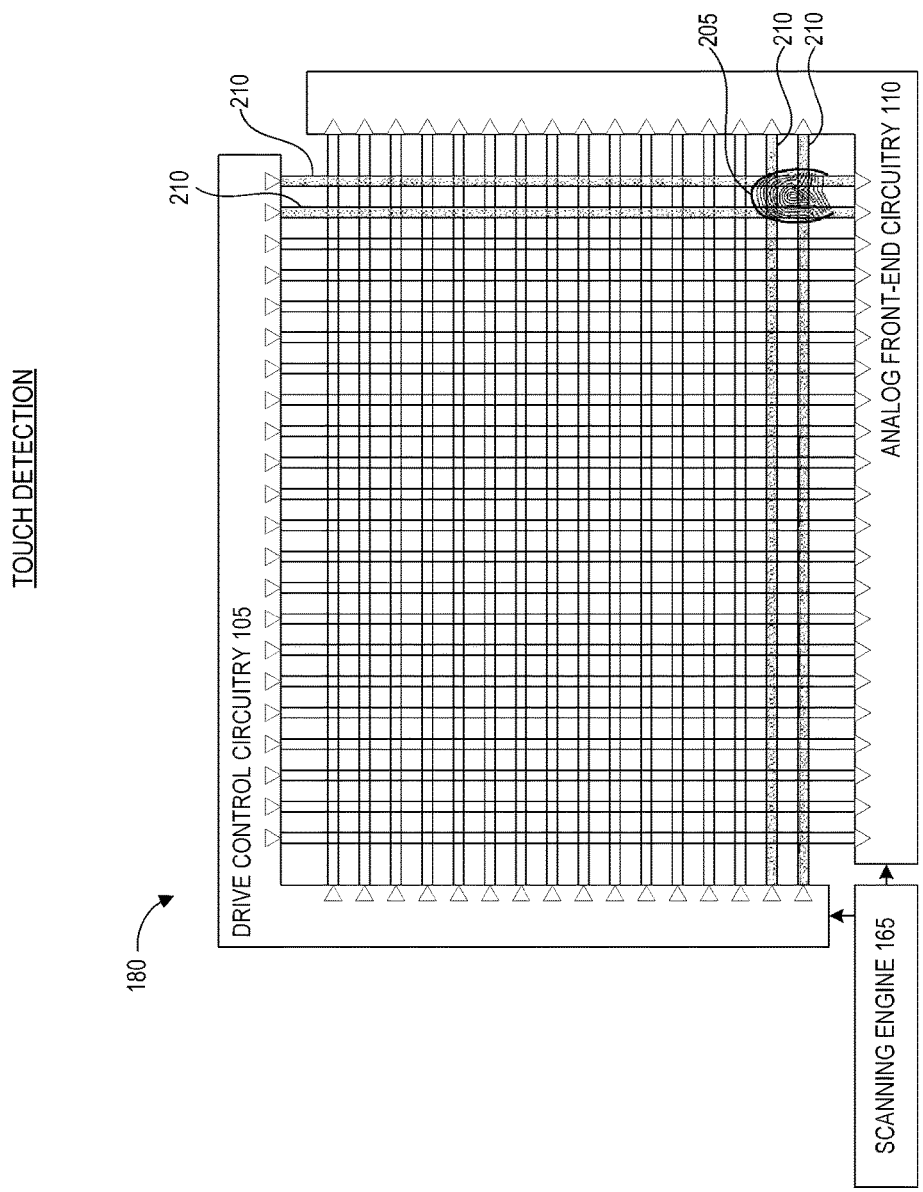
FIG. 2A illustrates an embodiment of a touch event on the touch panel of FIG. 1 sensed through absolute capacitance.

FIG. 2A illustrates an embodiment of a touch event 205 on the touch panel 180 of FIG. 1 sensed through absolute capacitance. The absolute capacitance of a number of sensors 210, illustrated with shading, can be increased due to proximity to the touch event 205. Although only sensors 210 underlying the touch event 205 are illustrated as having an increased absolute capacitance, in some examples all sensors within a range of the touch event location 205 may experience detectable increases in absolute capacitance. In some embodiments, until the absolute capacitance indication of touch event 205 is detected, the scanning engine 165 may configure drive control circuitry 105 and analog front-end circuitry 110 to passively monitor absolute capacitance of the panel 180, thereby saving power compared to continuous or intermittent mutual capacitance scanning.

The measured absolute capacitance of sensors 210 can be sensed by analog front-end circuitry 110 and converted into digital signals by the charge control circuitry 170 as described above with respect to FIG. 1. The measured absolute capacitance of sensors 210 can be provided to the touch processing module 175 for comparison to a baseline absolute capacitance of the sensors. Current measured data is compared with the baseline or no-touch data, for example by subtracting the baseline capacitance value from the current measured data. The baseline absolute capacitance can be maintained by the data repository 195 as discussed above. If the measured absolute capacitance changes from the baseline absolute capacitance by a sufficiently large amount in a sufficiently short period of time, then the touch processing module 175 may determine that a touch event has likely occurred on the panel 180. Based on this determination, features of the touch event such as general coordinates can be sent from touch processing module 175 to touchscreen subsystem controller 140 in order to generate instructions (for example, scanning parameters) for scanning engine 165 to configure the drive control circuitry 105 and analog front-end circuitry 110 to perform a focused active scan of a sub-region of touch panel 180. As described above, the touch processing module 175 can generate the scanning parameters and send the scanning parameters to the touchscreen subsystem controller 140 in some embodiments.

FIG. 2B illustrates one embodiment of identifying an adaptively sized and located sub-region 215 of the touch panel 180 based at least partly on the touch event 205 sensed in FIG. 2A. The changes in baseline capacitance detected in FIG. 2A can indicate a sub-region of the touch panel in which a touch event likely occurred. As discussed above, absolute capacitance touch data may not provide a specific point location for a touch event. As such, a generalized region of the touch event may be used for dynamically generating the sub-region 215. Accordingly, the touch processing module 175 can determine the size and location sub-region 215 to include a portion of the sensors 210 that experienced a deviation from baseline capacitance and possibly, in other examples, a range of sensors within a predetermined region, for example within around 5 or around 10 sensors in some embodiments.

The scanning engine 165 can configure the drive control circuitry 105 and analog front-end circuitry 110 to scan sub-region 215 in focused active scan mode by sensing mutual capacitance, for example by sending selector signals 185 activating output terminals 220 corresponding to the sensors 210 identified for the sub-region 215 in a predetermined sequence. The mutual capacitance of the sensors 210 can be sensed at the corresponding input terminals 225, and the raw touch data can be converted to digital signals by the charge control circuitry 170 for example based on selector signals 190. In some embodiments, all output terminals 220 corresponding to the sub-region 215 may be activated to scan all sensors 210, and accordingly sensor data will be received from all input terminals 225. In other embodiments, the selector signals 185 from the scanning engine 165 may configure the output terminals 220 to scan only a portion of the sub-region 215 until sufficient sensor data is acquired for determining the features of touch event 205. Alternatively or additionally, the selector signals 185 from the scanning engine 165 may identify a subset of output terminals based on a scan resolution. By focusing in on the sub-region 215 in which touch event 205 is more likely to occur, scanning engine 165 can detect touch event 205 in less time and using less power compared to full panel mutual capacitance scanning.

Figure 2C:
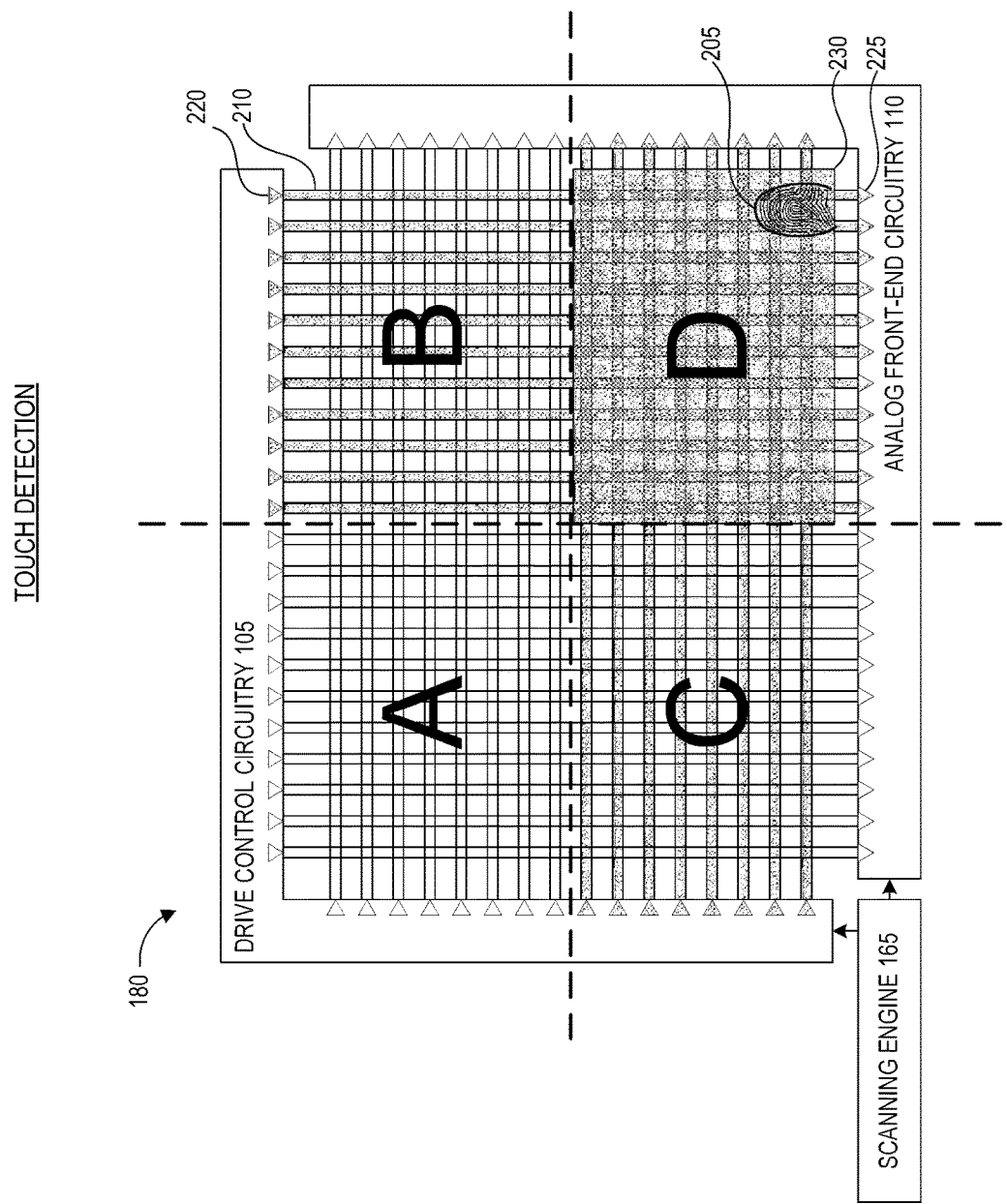
FIG. 2C illustrates another embodiment of identifying a sub-region of the touch panel based at least partly on the touch event sensed in FIG. 2A.

FIG. 2C illustrates an embodiment of identifying a predefined sub-region 230 of the touch panel 180 based at least partly on the touch event 205 sensed in FIG. 2A. In some embodiments, the touch panel 180 can be divided into a number of predefined sub-regions, each including a subset of the capacitors formed by the intersections of sensors of the touch panel 180. Although four predefined sub-regions A, B, C, D are depicted in FIG. 2C, this is for illustrative purposes and is not meant to limit predefined sub-regions to including four substantially equal sized regions of the panel 180. For example, in other embodiments the panel 180 can be divided into greater or fewer sub-regions, and the sub-regions may be of equal or unequal sizes. In some embodiments, areas of the panel 180 in which touch events are more frequently detected may be divided into smaller sub-regions than areas of the panel 180 in which touch events are less frequently detected to facilitate faster touch detection in the higher traffic areas. In some embodiments, the predefined sub-regions can be modified based on the frequency and location of touch events in a history of touch events associated with a specific user or device.

Touch processing module 175 can determine which sub-region region is associated with a location of the absolute capacitance touch data. As illustrated, predefined sub-region D encompasses touch event 205, and accordingly scanning engine 165 can select predefined sub-region D for further scanning in focused active scan mode. In some examples, the generalized region for touch event 205 indicated by absolute capacitance changes may overlap a boundary between two or more sub-regions. In one embodiment, each sub-region including at least a portion of the sensors experiencing absolute capacitance changes can be selected for further scanning in focused active scan mode. However, this may result in large portions or all of the panel 180 being scanned in the scenario in which the touch event falls into each of the four illustrated quadrants. Accordingly, in some embodiments, the scanning engine 165 can select from a number of predetermined sub-region configurations based on identifying a focused active scan region below a certain size threshold. In some embodiments, the touch processing module 175 can have a default mode for selecting a predefined sub-region as illustrated in the example of FIG. 2C, but if two or more sub-regions correspond to the absolute capacitance touch data, then the scanning engine 165 can generate an adaptively sized and located scan region as illustrated in FIG. 2B.

In some embodiments, a user may input a multitouch gesture using many fingers that covers a large portion of the panel 180. Accordingly, the area of the resulting sub-region may not be much smaller than the total area of the panel 180. However, typical touch gestures involve one finger or two fingers in close proximity, such as for a pinch or "zoom" gesture. Accordingly, the area of the identified sub-region may typically have an area that is much smaller than the total area of the panel 180. This can result in a much faster detection rate and noticeable improvement in response time, particularly on large panels having thousands of capacitor nodes formed by the sensors.

Overview of Example Scanning Engine

Figure 3:
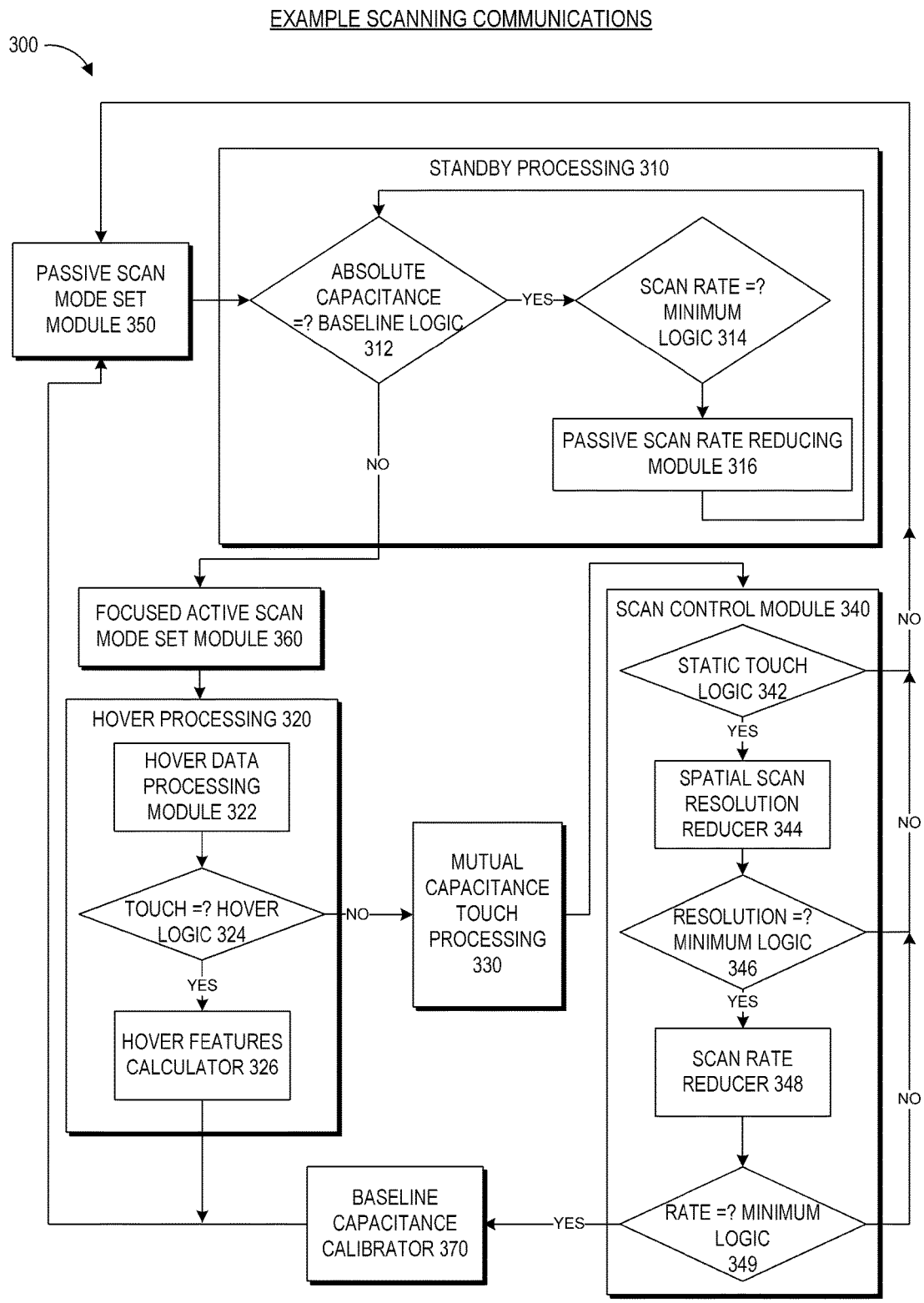
FIG. 3 illustrates a high-level block diagram of an embodiment of an example data communications for performing the touch panel scan control techniques described herein.

FIG. 3 illustrates an embodiment of an example data communications between modules of a touch sensing system 300 during performance of the touch panel scan control techniques described herein. The modules of scan control system 300 can be executed by components of the system 100 of FIG. 1, as will be mapped out in more detail below. The scan control system 300 can include standby processing module 310, hover processing module 320, mutual capacitance touch processing module 330, scan control module 340, passive scan mode set module 350, focused active scan mode set module 360, and baseline capacitance calibrator 370.

Standby processing module 310 can be implemented by scanning engine 165 sending selector signals 185, 190 to configure the drive control circuitry 105 and analog front-end circuitry 110, respectively, to scan touch panel 180 in passive scan mode. Because passive scan mode operates to monitor the absolute capacitance of the sensors 120 of touch panel 180, the selector signals 185 may indicate that no output terminals 115 are provided with drive signal 150. In some embodiments, touchscreen subsystem controller 140 may output instructions to the power manager 145 to not send drive signal 150 during passive scan mode. Selector signals 190 may indicate, to charge control circuitry 170, which input terminals 125 from which to convert raw sensor signals into digital data. Touch processing module 175 may analyze the digital data from charge control circuitry 170 to determine whether a measured absolute capacitance value at a selected sensor corresponds to a stored baseline capacitance value.

Accordingly, standby processing module 310 can be configured to run during passive scan mode and can include capacitance comparison logic 312, scan rate comparison logic 314, and scan rate reducing module 316. Capacitance comparison logic 312 can be executed by touch processing module 175 upon receiving measured absolute capacitance data corresponding one or more selected sensors in the touch panel. Capacitance comparison logic 312 can include instructions to compare the measured absolute capacitance value to a stored baseline capacitance value. If the difference between the measured absolute capacitance and the baseline capacitance is greater than a threshold, this can cause the scanning engine 165 to set the focused active scan mode at module 360. The threshold may be adaptively determined as a meaningful difference between baseline and measured absolute capacitance can vary based on factors such as humidity and temperature of the environment of the touch panel, and any known method for determining such thresholds can be implemented to determine the thresholds used in the systems and processes described herein. If the difference between the measured absolute capacitance and the baseline capacitance is less than the threshold, then the scanning engine 165 can compare a current passive scan rate to a minimum scan rate at scan rate comparison logic 314. The minimum scan rate can be selected based on system configuration to provide a trade-off between response time and resource consumption (for example, power). If the scan rate is greater than the minimum, it can be reduced at scan rate reducing module 316 for greater power efficiency. If the scan rate equals the minimum, then passive scan mode can continue by executing capacitance comparison logic 312 at the minimum scan rate. Touchscreen subsystem controller 140 in some embodiments may execute scan rate comparison logic 314 and scan rate reducing module 316 to generate instructions for timing circuitry 155 to send clock signals 160 and for scanning engine 165 to send selector signals 185, 190.

Focused active scan mode set module 360 can be implemented by touch processing module 175 and touchscreen subsystem controller 140. After touch processing module 175 determines that a change in baseline capacitance corresponding to a potential touch has occurred at one or more sensors, the touch processing module 175 can generate approximate coordinates of the potential touch event using the measured absolute capacitance values and corresponding sensor locations. This can be used to specify a sub-region of the touch panel 180 for focused active scanning, for example as described above with respect to FIGS. 2A-2C. Touchscreen subsystem controller 140 can generate instructions for scanning engine 165 to send selector signals 185, 190 to configure drive control circuitry 105 and analog-front end circuitry 110 for focused active scan of the sub-region.

Accordingly, focused active scan mode set module 360 can include instructions to generate instructions for the drive control circuitry 105 to drive a specific set of sensors for mutual capacitance scanning at an active scan rate, for example sensors corresponding to a sub-region of the touch panel having an area less than the touch panel area. Focused active scan module 360 can also include instructions to select a number of input terminals 125 from which to use electrical signal data for touch processing. Focused active scan mode set module 360 can include instructions to accordingly determine a sub-region of the touch panel to scan using mutual capacitance, and also can include instructions to set a rate of the mutual capacitance scan as well a resolution of the mutual capacitance scan. Scan resolution as used herein can refer to the fraction or percentage of total sensors in a touch panel used for the scan, wherein the percentage of total sensors can be distributed in a substantially uniform density over the area of the touch panel. To illustrate, a typical touch event may have a width of approximately five sensors in one embodiment, as determined by touch history data such as can be stored in data repository 195. Accordingly, the scan resolution can be set to cover 20% of the sensors, where every fifth sensor is used for the scan. The concept of scan resolution is discussed in more detail below with respect to FIG. 5.

After focused active scan mode set module 360 sets mutual capacitance scanning parameters for a particular sub-region of the touch panel, hover processing module 320 can analyze the mutual capacitance data to determine whether a hover touch event has occurred. In one embodiment, hover processing module 320 can include hover data processing module 322, hover logic 324, and hover features calculator 326. Hover data processing module 322 can be configured to analyze the mutual capacitance data to aid in determining whether the data is consistent with hover touch data in some embodiments, for example by performing false touch rejection. Based on the output of hover data processing module 322, the hover logic 324 can determine whether the touch is a hover. If the touch is a hover, then hover feature calculator 326 can determine features of the hover such as location and speed using the mutual capacitance data. If the touch is not a hover, then the mutual capacitance data can be output to mutual capacitance touch processing module 330. Mutual capacitance touch processing module 330 can determine features of the touch from the mutual capacitance data. Touch features can include location, size, duration, movement, to name a few. In some embodiments, hover processing module 320 and/or mutual capacitance touch processing module 330 can be executed by touch processing module 175. Although not illustrated in FIG. 3, the touch features determined by the mutual capacitance touch processing module 330 can be sent to a gesture recognition module for associating a touch gesture and corresponding action with the touch event for delivery to the host device processor. Accordingly, mutual capacitance touch processing module 330 can determine the features of the touch needed by other modules to generate a command for the device based on the touch.

After the touch features are determined, the touch features can be sent from the mutual capacitance touch processing module 330 to the scan control module 340 in order to determine scanning parameters for a subsequent touch event. Scan control module 340 can be executed by the touch processing module 175 to determine the scanning parameters. Scan control module 340 can include static touch logic 342, spatial scan resolution reducer 344, minimum resolution logic 346, scan rate reducer 348, and minimum rate logic 349. Static touch logic 342 can include instructions to compare current measured mutual capacitance data to stored mutual capacitance data for one or more recent touch events in order to determine whether the current touch event is a static touch, i.e. a user holding a finger in a stationary position against the touch panel. If static touch logic 342 determines that the touch event was not static touch, then touch processing module 175 can send an indication to touchscreen subsystem controller 140 to generate instructions for a passive scan of the touch panel to conserve power resources while waiting for a next touch event.

If static touch logic 342 determines that the touch event is a static touch, then the features of the static touch are already known, and therefore mutual capacitance scanning is not needed for generating touch data for the static touch and would unnecessarily consume system resources. Accordingly, scan control module 340 can execute spatial scan resolution reducer 144 to reduce a resolution of the scan and minimum resolution logic 346 to determine whether the resolution is at a minimum, and can also execute scan rate reducer 348 to reduce a rate of the scan and minimum rate logic 349 to determine whether the rate is at a minimum. Reduced scan resolution parameters and reduced scan rate parameters can be output to the touchscreen subsystem controller 140 for configuring a subsequent focused active scan when focused active scan mode set module 360 is called in order to conserve resources during the static touch, as the static touch will continue to register as a change from baseline absolute capacitance, triggering the focused active scan. Once the static touch logic 342 determines that the touch is not a static touch, the scanning parameters can be reset for the next focused active scan. If minimum resolution logic 346 and minimum rate logic 349 determine that both the scan resolution and scan rate are set to a minimum, then the static touch may represent changing conditions of the touch panel, and baseline capacitance calibration module 370 can be called to calibrate the baseline capacitance value accordingly.

Baseline capacitance calibrator 370 can use the touch data output by the scan control module 340 to determine a new value for the baseline capacitance. As described above, various factors such as humidity and cleanliness of the touch panel, among others, can affect the baseline capacitance values detected for the touch panel sensors. Baseline capacitance calibrator 370 can account for such changes by determining a new baseline capacitance value, enabling more accurate detection of possible touch events. After calibrating the baseline capacitance, passive scan mode set module 350 can configure the touch panel for monitoring of absolute capacitance of some or all of the sensors.

Overview of Touch Panel Scan Control Techniques

Figure 4:
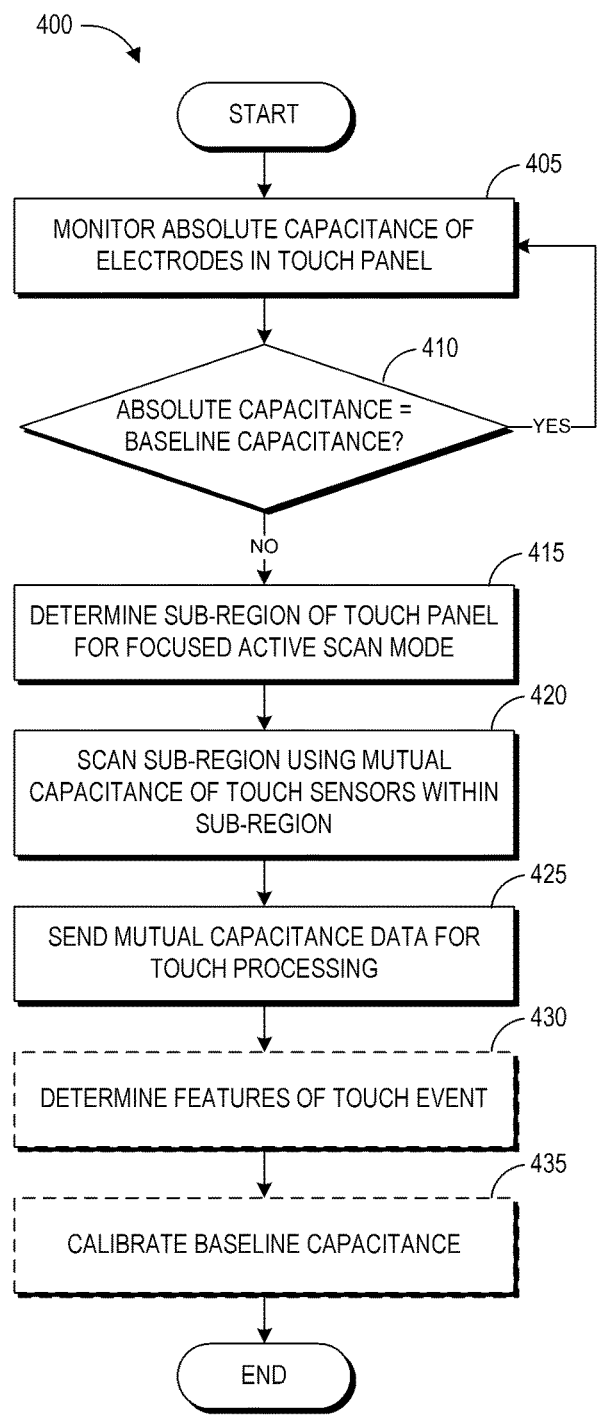
FIG. 4 illustrates an embodiment of a touch panel scan control process.

FIG. 4 illustrates an embodiment of a touch panel scan control process 400. Process 400 can be implemented by the scanning engine 165 of FIG. 1 or 3 in some embodiments. Although process 400 is discussed in the context of the touch sensing system of FIG. 1, this is for illustrative purposes and other touch sensing systems having the adaptive scanning capabilities described herein can execute process 400.

Process 400 begins at block 405, at which the scanning engine 165 monitors the absolute capacitance of sensors in a touch panel. In one embodiment, absolute capacitance of each column or row sensor can be scanned sequentially. In another embodiment, absolute capacitance of a subset of the column and row sensors can be scanned sequentially as a reduced resolution touch panel. In other embodiments, absolute capacitance of two or more column and row sensors can be scanned synchronously. Some embodiments of process 400 can monitor the aggregate baseline capacitance of some or all of the sensors in the touch panel.

At decision 410, the scanning engine 165 compares the measured absolute capacitance to the baseline capacitance value. The baseline capacitance value reflects the capacitance of the measured sensor or sensors in a no-touch condition. The scanning engine 165 can calculate a difference between the baseline capacitance and the measured absolute capacitance, and this difference can be compared to a threshold to determine whether a touch event has likely occurred. In some embodiments, the change in absolute capacitance due to the touch event can be quite small in comparison with the baseline capacitance. As an example, the change due to touch can be a few pico-Farads, whereas the baseline capacitance of the sensor can be around 50 pF. Accordingly, in some embodiments the threshold may correspond to a difference between the baseline capacitance and the measured absolute capacitance of even a few pico-Farads.

At block 415, the scanning engine 165 determines a sub-region of the touch panel for scanning in focused active scanning mode. The sub-region can represent an area smaller than the total area of the touch panel where the touch event is likely occurring. When a finger (or other conductive element) comes close enough to change this capacitance value, this change is measured and analyzed, and a touch location is calculated. In some embodiments, the touch location is generally calculated to determine a relatively large sub-region. In some embodiments, the touch location can be specifically calculated to determine a relatively small sub-region. In other embodiments, the touch location can be compared to a number of predefined sub-regions of the touch panel to determine a sub-region corresponding to one or more of the predefined sub-regions. Accordingly, use of the passive scan mode to monitor the touch panel during a no-touch state and to identify a sub-region where the touch is likely occurring can provide for less delays noticeable to the user of the device as well as more efficient power usage when compared to conventional mutual capacitance scanning.

At block 420, the scanning engine 165 scans the sub-region using mutual capacitance scanning. For example, the scanning engine 165 can provide instructions to the drive control circuitry 105 to selectively apply voltage to sensors contained at least partially within the sub-region, thereby testing the mutual capacitance of the sub-region and not the remainder of the touch panel. Accordingly, use of the focused active scan mode to determine the coordinates of the touch event can provide for less delays noticeable to the user of the device when compared to conventional mutual capacitance scanning. Further, because only a portion of the touch panel is scanned using mutual capacitance, less voltage is required for the scan, providing for greater power efficiency using the focused active scan.

At block 425, the scanning engine 165 can send the mutual capacitance data for touch processing. In some embodiments, scanning engine can scan the entire sub-region before sending the mutual capacitance data for touch processing. In other embodiments, the scanning engine 165 can scan the sub-region until a touch event is identified and can send only the mutual capacitance data of sensors forming capacitors affected by the touch event.

Some embodiments of process 400 can include block 430 to determine features of the touch event, for example using one or both of touchscreen system controller 140 or touch processing module 175. Features of the touch event can include a size, shape, location (e.g., coordinates of the touch on the touch panel), movement, and gesture of the touch event, among other things.

Some embodiments of process 400 can also include block 435 for calibration of the baseline capacitance. For example, if the touch features calculated at block 430 indicate that the touch event is a false touch (e.g., not a touch but rather noise due to a changing environment of the touch panel), then the scanning engine 165 can use the touch data to recalibrate the baseline capacitance to compensate for the changing environment.

The adaptive alternation between passive and focused active scan modes, as well as the baseline capacitance calibration, make process 400 robust to different usage modes (e.g., by both small and large finger sizes, tap or drag gestures, etc.), manufacturing variability in the touch panel, noise in the system, and at the same time give good results in terms of response times, accuracy (local and global), and power usage, leading to a streamlined user experience.

Overview of Example Touch Panel Scan Resolution

Figure 5:
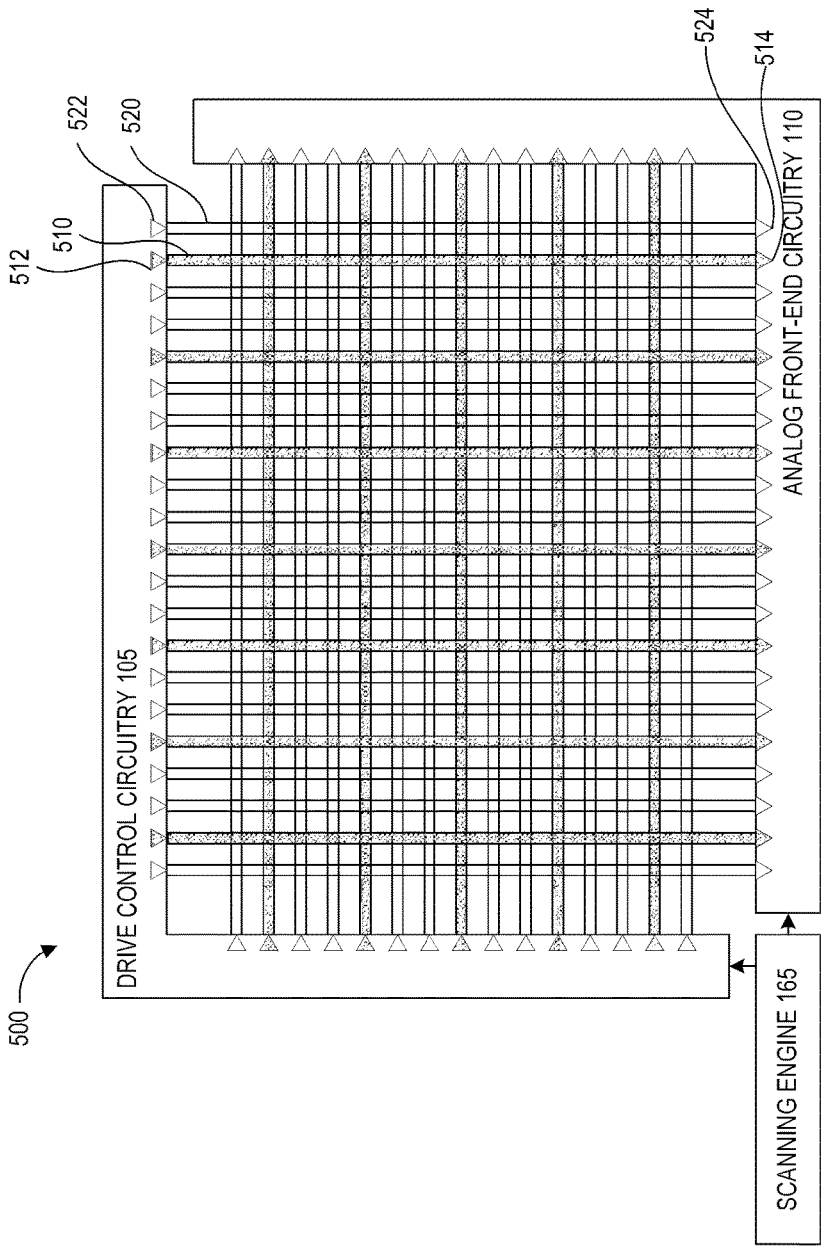
FIG. 5 illustrates an embodiment of a touch panel configured for a reduced resolution scan.

FIG. 5 illustrates an embodiment of a high resolution touch panel 500 configured for a reduced resolution scan. Reducing the resolution of a touch panel scan in certain situations can provide for decreased touch detection times and decreased power consumption by the touch panel scan. However, scanning at a higher resolution can provide advantages such as heightened accuracy. Accordingly, the resolution of the touch panel 500 can be reduced during a portion of the scan time for scanning panel 500, while the panel 500 can be scanned at increased or full resolution during other portions of the scan time.

To form a reduced resolution touch panel from a high resolution touch panel, a first portion of the touch panel sensors 510 and their corresponding output terminals 512 and input terminals 514 can be selected for inclusion in the reduced resolution scan of the touch panel. A second portion of the touch panel sensors 520 and their corresponding output terminals 522 and input terminals 524 can be excluded from the scan. For example, the scanning engine 165 can determine, based on touch history data or predetermined empirical data, a size of a finger or other instrument used to interact with the touch panel 500. The resolution of the touch panel can be reduced so that the distance between active sensors 605 approximates or is slightly less than the diameter of the finger or input instrument. Accordingly, the number of scanned sensors is optimized to conserve power and reduce the amount of time required to scan the entire panel 500 while preserving the ability to detect user input.

Although the illustrated embodiment depicts two excluded sensors 520 between each selected sensor 510, it will be appreciated that this is for purposes of example and that other spacing could be used in other embodiments. In addition, the spacing between selected row sensors and selected column sensors may be equal or different in some embodiments. The reduced resolution panel configuration illustrated in FIG. 5 depicts even spacing between the selected sensors, however spacing may vary across the touch panel, for example using a higher density of selected sensors in "high traffic" areas frequently associated with touch event locations and using a lower density of selected sensors in "low traffic" areas of the touch panel that are less frequently associated with touch events.

In some embodiments, a reduced resolution scan such as the example depicted in FIG. 5 can be combined with a sub-region scan such as the examples depicted in FIGS. 2A-2C in order to further reduce power usage and the time between initializing the scan and detecting the touch.

Implementing Systems and Terminology

Implementations disclosed herein provide systems, methods and apparatus for touch panel scan control. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more touch sensitive panels, one or more scan control engines, one or more processors, and a memory including instructions or modules for carrying out the touch panel scan control processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A touch sensing display system comprising:
   a touch panel including:
      a plurality of sensors arranged to form a plurality of capacitors,
      drive circuitry in data communication with a plurality of output terminals, each of the plurality of output terminals configured to apply voltage to one of the plurality of sensors when activated, and
      analog front-end circuitry in data communication with a plurality of input terminals, each of the plurality of input terminals configured to sense electrical signals from one of the plurality of sensors;
   a scan control system including
      a passive scan module configured to monitor absolute capacitance of the plurality of sensors of the touch panel,
      a focused active scan module configured to drive sets of at least some of the plurality of sensors using mutual capacitance scanning at an active scan rate, and
      a hover module configured to determine whether data received from the plurality of sensors of the touch panel is consistent with hover touch data and, in response to determining that the data is consistent with the hover touch data, to output an indication to scan the touch panel using the passive scan module,
      the scan control system configured to at least generate instructions for a scan of the touch panel by adaptively selecting one of the passive scan module and the focused active scan module to perform the scan of the touch panel, and to generate instructions to scan a reduced subset of the plurality of sensors of the touch panel during at least a portion of the scan, wherein the reduced subset of the plurality of sensors are distributed in a spatially non-uniform density over an area of the touch panel, wherein the spatially non-uniform density includes a first region and a second region, the first region more frequently associated with touch event locations than the second region, the first region having a higher density of the reduced subset than the second region; and
   a scanning engine configured to at least configure one or both of the drive circuitry and the analog front-end circuitry to perform the scan according to the instructions.

2. The system of claim 1, wherein the passive scan module includes instructions to at least perform a first scan of the touch panel by measuring absolute capacitance of a selected sensor of the plurality of sensors to determine a measured absolute capacitance value.

3. The system of claim 2, wherein the passive scan module includes instructions to at least compare the measured absolute capacitance to a baseline absolute capacitance value to generate a difference value.

4. The system of claim 3, further comprising a memory configured to at least store the baseline absolute capacitance value.

5. The system of claim 3, further comprising a baseline capacitance calibration module including instructions to at least calibrate the baseline capacitance value to generate an updated baseline capacitance value to compensate for effects of a changing environment of the touch panel on baseline absolute capacitance values.

6. The system of claim 3, wherein if the difference value exceeds a threshold, then the scan control system is configured to at least select the focused active scan module to perform a second scan of the touch panel.

7. The system of claim 6, wherein the scan control system is configured to at least limit the second scan to a sub-region of the touch panel based at least partly on a location of the selected sensor, wherein the sub-region comprises an area smaller than an area of the touch panel and is likely to contain a touch event.

8. The system of claim 7, wherein, to limit the second scan to the sub-region, the scan control system is configured to provide the instructions to the scanning engine, the instructions including one or more selector signals to configure the drive circuitry to selectively apply voltage to one of the plurality of output terminals corresponding to the selective sensor.

9. The system of claim 1, wherein the focused active scan module includes instructions to at least perform the scan of the touch panel by measuring mutual capacitance of at least one of the plurality of capacitors.

10. The system of claim 1, the scan control system further comprising a touch processing module configured to at least analyze touch data resulting from the scan of the touch panel.

11. A method for detecting touch events on a touch panel, the method comprising:

selecting a passive scan mode for a first scan of at least a portion of the touch panel;

based on the selection of the passive scan mode, measuring absolute capacitance of at least one of a plurality of sensors of the touch panel to determine a measured absolute capacitance value;

comparing the measured absolute capacitance to a baseline absolute capacitance value to generate a difference value;

comparing the difference value to a threshold, wherein the difference value exceeding the threshold indicates a possibility of a touch event on the touch panel;

in response to the difference value not exceeding the threshold; selecting the passive scan mode to perform a second scan of the touch panel;

in response to the difference value exceeding the threshold selecting a focused active scan mode to perform the second scan of at least a portion of the touch panel, analyzing data resultant from the second scan to determine whether the data is consistent with hover touch data, and in response to determining that the data is consistent with the hover touch data, outputting an indication to perform a third scan of the touch panel using the passive scan mode; and generating instructions to scan a reduced subset of the plurality of sensors of the touch panel during at least a portion of the first scan, the second scan, or the third scan, wherein the reduced subset of the plurality of sensors are distributed in a spatially non-uniform density over an area of the touch panel, wherein the spatially non-uniform density includes a first region and a second region, the first region more frequently associated with touch event locations than the second region, the first region having a higher density of the reduced subset than the second region.

12. The method of claim 11, wherein, if focused active scan mode is selected to perform the second scan, the method further comprises generating mutual capacitance data by measuring mutual capacitance of at least one of a plurality of capacitors, each of the plurality of capacitors formed by intersection of two of the plurality of sensors.

13. The method of claim 12, further comprising determining features of the touch event based at least partly on the mutual capacitance data.

14. The method of claim 13, wherein the features include one or more of size, shape, location, movement, and gesture of the touch event.

15. The method of claim 13, wherein the features indicate that the touch event is a false touch event, wherein the false touch event corresponds to noise due to a changing environment of the touch panel.

16. The method of claim 15, further comprising calibrating the baseline capacitance to generate an updated baseline capacitance value to compensate for effects of the changing environment of the touch panel on baseline absolute capacitance values.

17. The method of claim 16, further comprising measuring absolute capacitance of at least one of the plurality of sensors to determine a second measured absolute capacitance value.

18. The method of claim 17, further comprising comparing the second measured absolute capacitance to the updated baseline absolute capacitance value to generate a second difference value.

19. The method of claim 11, wherein, if focused active scan mode is selected to perform the second scan, the method further comprises identifying a sub-region comprising an area smaller than an area of the touch panel and is likely to contain a touch event.

20. The method of claim 19, wherein identifying the sub-region is based at least partly on a location of the at least one of the plurality of sensors corresponding to the difference value determined to exceed the threshold.

21. The method of claim 11, wherein, if focused active scan mode is selected to perform the second scan, the method further comprises reducing a resolution of the touch panel for the second scan.

22. Non-transitory computer-readable media storing computer-executable instructions that, when executed by one or more physical computing devices, cause operations comprising:

measuring absolute capacitance of at least one of a plurality of sensors of the touch panel to determine a measured absolute capacitance value;

comparing the measured absolute capacitance to a baseline absolute capacitance value to generate a difference value;

comparing the difference value to a threshold, wherein the difference value exceeding the threshold indicates a possibility of a touch event on the touch panel;

in response to the difference value not exceeding the threshold; selecting a passive scan mode to perform a scan of the touch panel;

in response to the difference value exceeding the threshold selecting a focused active scan mode to perform the scan of at least a portion of the touch panel, analyzing data resultant from the second scan to determine whether the data is consistent with hover touch data, and in response to determining that the data is consistent with the hover touch data, outputting an indication to perform an additional scan of the touch panel using the passive scan mode; and generating instructions to scan a reduced subset of the plurality of sensors of the touch panel during at least a portion of the scan or the additional scan, wherein the reduced subset of the plurality of sensors are distributed in a spatially non-uniform density over an area of the touch panel, wherein the spatially non-uniform density includes a first region and a second region, the first region more frequently associated with touch event locations than the second region, the first region having a higher density of the reduced subset than the second region.

23. The non-transitory computer-readable media of claim 22, the operations further comprising calibrating the baseline capacitance value to generate an updated baseline capacitance value to compensate for effects of a changing environment of the touch panel on baseline absolute capacitance values.

24. The non-transitory computer-readable media of claim 22, wherein if focused active scan mode is selected to perform the scan, the operations further comprise generating mutual capacitance data by measuring mutual capacitance of at least one of a plurality of capacitors formed one or more of the plurality of sensors.

25. The non-transitory computer-readable media of claim 22, wherein if focused active scan mode is selected to perform the scan, the operations further comprise identifying a sub-region to which the scan is limited, the sub-region comprising an area smaller than an area of the touch panel likely to contain a touch event.

26. The non-transitory computer-readable media of claim 22, wherein if focused active scan mode is selected to perform the scan, the operations further comprise reducing a resolution of the touch panel for the scan.

27. A touch panel display apparatus comprising:
means for measuring absolute capacitance of at least one of a plurality of sensors of a touch panel to determine a measured absolute capacitance value;
means for comparing the measured absolute capacitance to a baseline absolute capacitance value to generate a difference value;
means for comparing the difference value to a threshold, wherein the difference value exceeding the threshold indicates a possibility of a touch event on the touch panel;
means for selecting, based at least partly on a result of comparing the difference value to the threshold, one of a focused active scan mode and a passive scan mode to perform a scan of at least a portion of the touch panel;
means for determining whether data resultant from the scan is consistent with hover touch data, and, in response to determining that the data is consistent with the hover touch data, outputting an indication to perform an additional scan of the touch panel using the passive scan mode; and
generating instructions to scan a reduced subset of the plurality of sensors of the touch panel during at least a portion of the scan or the additional scan, wherein the reduced subset of the plurality of sensors are distributed in a spatially non-uniform density over an area of the touch panel, wherein the spatially non-uniform density includes a first region and a second region, the first region more frequently associated with touch event locations than the second region, the first region having a higher density of the reduced subset than the second region.

28. The apparatus of claim 27, further comprising means for determining scanning parameters including one or both of scan rate and scan resolution.

29. The apparatus of claim 27, further comprising means for limiting the focused active scan to a sub-region of the touch panel comprising an area smaller than an area of the touch panel.

30. The apparatus of claim 27, further comprising means for calibrating the baseline absolute capacitance value.

* * * * *